United States Patent
Allen et al.

(10) Patent No.: US 9,626,790 B1
(45) Date of Patent: Apr. 18, 2017

(54) VIEW-DEPENDENT TEXTURES FOR INTERACTIVE GEOGRAPHIC INFORMATION SYSTEM

(71) Applicant: Google Inc., Mountain View, CA (US)

(72) Inventors: Brett A. Allen, San Francisco, CA (US); Scott E. Dillard, Shoreline, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/852,771

(22) Filed: Sep. 14, 2015

Related U.S. Application Data

(62) Division of application No. 13/921,581, filed on Jun. 19, 2013, now Pat. No. 9,171,402.

(51) Int. Cl.
| | | |
|---|---|---|
| *G06T 15/04* | (2011.01) | |
| *G06T 17/05* | (2011.01) | |
| *G06T 17/20* | (2006.01) | |
| *G06T 19/00* | (2011.01) | |
| *G06T 15/20* | (2011.01) | |

(52) U.S. Cl.
CPC .............. *G06T 15/04* (2013.01); *G06T 15/20* (2013.01); *G06T 17/05* (2013.01); *G06T 17/20* (2013.01); *G06T 19/003* (2013.01); *G06T 2219/028* (2013.01)

(58) Field of Classification Search
None
See application file for complete search history.

(56) References Cited

U.S. PATENT DOCUMENTS

| | | |
|---|---|---|
| 6,525,731 B1 | 2/2003 | Suits et al. |
| 7,348,989 B2 | 3/2008 | Stevens et al. |
| 8,279,218 B1 | 10/2012 | Fan et al. |
| 2003/0044088 A1 | 3/2003 | Wright |
| 2006/0017722 A1 | 1/2006 | Hong et al. |
| 2009/0128549 A1 | 5/2009 | Gloudemans et al. |

(Continued)

OTHER PUBLICATIONS

Debevec et al., "Modeling and Rendering Architecture from Photographs: A Hybrid Geometry-and Image-Based Approach", Proceedings from the 23$^{rd}$ Annual Conference on Computer Graphics and Interactive Techniques, Aug. 4-9, 1996, New Orleans, Louisiana, pp. 11-20.

(Continued)

*Primary Examiner* — Jacinta M Crawford
*Assistant Examiner* — Phuc Doan
(74) *Attorney, Agent, or Firm* — Dority & Manning, P.A.

(57) ABSTRACT

Systems and methods for rendering a view-dependent texture in conjunction with a polygon mesh to provide a textured three-dimensional model of a geographic area are provided. The view-dependent texture can be optimized for viewing the three-dimensional model from a single reference direction. When a user navigates to a camera viewpoint of the three-dimensional model associated with the single reference direction, the view-dependent texture can be rendered in conjunction with the three-dimensional model to provide a more realistic representation of the geographic area to the user. When a user navigates to a camera viewpoint of the three-dimensional model that is not associated with the single reference direction, a base texture can be rendered in conjunction with the three-dimensional model. The base texture can be optimized based on viewing the three-dimensional model from a plurality of differing viewpoints.

12 Claims, 7 Drawing Sheets

(56) References Cited

U.S. PATENT DOCUMENTS

2012/0120069 A1   5/2012   Kodaira et al.
2013/0009950 A1   1/2013   Ben-David et al.
2013/0322702 A1   12/2013  Piemonte et al.

OTHER PUBLICATIONS

Grimm et al., "Technical Report WUCS-2002-9: Creating View-Dependent Texture Maps", Washington University in St. Louis, Department of Computing Science, Nov. 22, 2000, 9 pages.
Pasewaldt, "Multiscale 3D Geovirtual Environments Using View-Dependent Multi-Perspective Views", Journal of WSCG, vol. 19, No. 3, Jan. 2011, pp. 111-1118.
Pollefeys et al., Detailed Real-Time Urban 3D Reconstruction from Video, International Journal of Computer Vision, vol. 78, Issue 2, Jul. 2008, pp. 143-167.
Porquet et al., "Real-Time High-Quality View-Dependent Texture Mapping Using Per-Pixel Visibility", Proceedings of the $3^{rd}$ International Conference on Computer Graphics and Interactive Techniques in Austrailia and Southeast Asia, Nov. 29-Dec. 2, 2005, Dunedin, New Zealand, pp. 213-220.
Semmo et al., "Interactive Visualization of Generalized Virtual 3D City Models Using Level-of-Abstraction Transitions", Computer Graphics Forum, vol. 31, Issue 3pt1, Jun. 2012, pp. 885-894.

VIEW-DEPENDENT TEXTURES FOR INTERACTIVE GEOGRAPHIC INFORMATION SYSTEM

PRIORITY CLAIM

The present application is a divisional of U.S. application Ser. No. 13/921,581 having a filing date of Jun. 19, 2013. Applicants claim priority to and benefit of all such applications and incorporate all such applications herein by reference.

FIELD

The present disclosure relates generally to interactive geographic information systems, and more particularly to rendering view-dependent textures in conjunction with a three-dimensional model in a geographic information system.

BACKGROUND

Geographic information systems provide for the archiving, retrieving, and manipulating of data that has been stored and indexed according to geographic coordinates of its elements. A geographic information system can be used for storing, manipulating, and displaying a graphical representation of a three-dimensional model of a geographic area. An interactive geographic information system can present the three-dimensional model of the geographic area to a user in a suitable user interface, such as a browser. A user can navigate the three-dimensional model by controlling a virtual camera that specifies what portion of the three-dimensional model is rendered and presented to a user.

The three-dimensional model can include a polygon mesh, such as a triangle mesh, used to model the geometry (e.g. terrain, buildings, and other objects) of the geographic area. Geographic imagery, such as aerial or satellite imagery, can be texture mapped to the three-dimensional model so that the three-dimensional model provides a more accurate and realistic representation of the scene. Typically, a single base texture is texture mapped to the polygon mesh regardless of the viewpoint of three-dimensional model. The single base texture can be optimized based on viewing the three-dimensional model from a plurality of differing viewpoints for the scene. For instance, the geographic imagery mapped to each polygon face (e.g. triangle face) in the polygon mesh can be selected according to a selection mechanism or algorithm that favors geographic imagery with a direct or near direct view of the polygon face. Given the varying orientations of the polygon faces in the mesh, the base texture typically is generated from base textures associated with a plurality of different view directions.

While the use of a single base texture can provide a realistic view of the three-dimensional model, certain visual artifacts can result from rendering a base texture optimized based on a plurality of different viewpoints in conjunction with the three-dimensional model. For instance, anomalies in the polygon mesh can become more readily apparent, in some cases giving the three-dimensional model a melted appearance. In addition, objects that are two small or too thin (e.g. cars, flag poles, streetlights, etc.) to be represented in the polygon mesh can lose their three-dimensional appearance.

SUMMARY

Aspects and advantages of the invention will be set forth in part in the following description, or may be obvious from the description, or may be learned through practice of the invention.

One exemplary aspect of the present disclosure is directed to a computer-implemented method for rendering a three-dimensional model of a geographic area. The method includes receiving, at a computing device, a user input requesting a view of the three-dimensional model from a first virtual camera viewpoint. The method includes obtaining, at the computing device, a polygon mesh modeling geometry of the geographic area and a base texture for the three-dimensional model. The base texture is optimized based on viewing the three-dimensional model from a plurality of different viewpoints. The method further includes obtaining a view-dependent texture for the three-dimensional model. The view-dependent texture is optimized for viewing the three-dimensional model from a reference viewpoint. The method further includes determining, with the computing device, that the first virtual camera viewpoint is within a threshold of the reference viewpoint and rendering on a display associated with the computing device the view-dependent texture in conjunction with at least a portion of the polygon mesh when the first virtual camera viewpoint is within the threshold of the reference viewpoint.

Other exemplary aspects of the present disclosure are directed to systems, apparatus, non-transitory computer-readable media, user interfaces and devices for rendering a view-dependent texture in conjunction with a geographic information system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
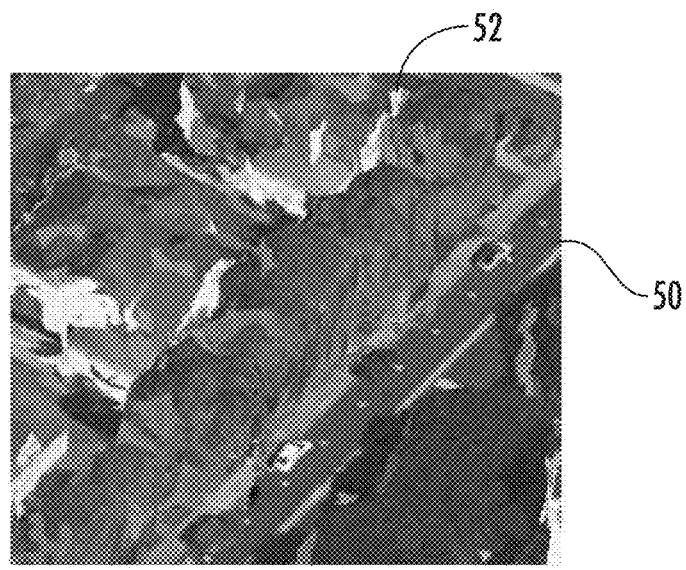
FIG. 1 depicts a graphical representation of an exemplary three-dimensional model of a geographic area rendered using a base texture that is texture mapped to a polygon mesh.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to rendering a view-dependent texture in conjunction with a polygon mesh to provide a textured three-dimensional model of a geographic area. The view-dependent texture can be optimized for viewing the three-dimensional model from a single view direction (i.e. a reference direction). When a user views the three-dimensional model from a camera viewpoint associated with the reference direction, the view-dependent texture can be rendered in conjunction with the three-dimensional model to provide a more realistic representation of the geographic area. When a user navigates to a camera viewpoint of the three-dimensional model that is not associated with the reference direction, a base texture can be rendered in conjunction with the three-dimensional model. The base texture can be optimized based on a plurality of differing views of the three-dimensional model. For instance, the base texture can be optimized for providing a direct (or near direct) and/or non-occluded (or near non-occluded) view of various portions of the three-dimensional model.

More particularly, one or more view-dependent textures can be generated and stored in a geographic information system for various reference viewpoints of the three-dimensional model. The reference viewpoints can be canonical viewpoints of the three-dimensional model. As used herein, a canonical viewpoint can refer to a standard and/or a predominate view of a geographic area, such as a north view, a south view, an east view, or a west view. Other suitable canonical viewpoints can include a northeast view, a northwest view, a southeast view, or southwest view. The canonical viewpoints can be default viewpoints of the three-dimensional model provided by the geographic information system. Additionally, canonical viewpoints can be views of the three-dimensional model provided as part of a virtual tour and/or can be popular views determined from usage data indicative of the number of requests to view the geographic area from a particular viewpoint.

According to a particular aspect of the present disclosure, there is a view-dependent texture for some, but not all, viewpoints of the model. For instance, five different view-dependent textures can be available for five different canonical viewpoints of the three-dimensional model, namely a north 45° oblique view, a south 45° oblique view, an east 45° oblique view, a west 45° oblique view, and a nadir (i.e. top-down) view of the three-dimensional model. These canonical viewpoints can be default or standard views of the three-dimensional model provided by the geographic information system. These canonical viewpoints can be commensurate with the view angles of typical source images (e.g. satellite and aerial imagery) captured of the geographic area and used to generate textures.

A view-dependent texture can be optimized for viewing the three-dimensional model from a single reference direction associated with the reference viewpoint. In particular, a view-dependent texture can be generated from source images that are more closely aligned with the reference direction. In one implementation, the view-dependent texture can be generated by creating a texture atlas mapping texture to the polygon mesh providing a representation of the geometry of the geographic area. The texture that is mapped to each portion (e.g. polygon face) of the polygon mesh can be selected from source images of the geographic area, such as satellite images or aerial images captured from an aircraft. The texture for each portion of the polygon mesh can be selected using a texture selection algorithm that favors source imagery more closely aligned with the reference direction associated with the reference viewpoint.

Rendering view-dependent textures in conjunction with the three-dimensional model can offer a more photographic experience for users while still staying in the three-dimensional environment provided by rendering textures in conjunction with a three-dimensional polygon mesh. For instance, the use of view-dependent textures can hide faulty geometry provided by the polygon mesh. View-dependent textures can also provide better uniformity of color and can provide a three-dimensional appearance to features that are too small (e.g. flag poles, streetlamps, cars, etc.) to be represented in the polygon mesh. The use of view-dependent textures can also improve the appearance of objects whose true geometry is very complex (e.g. trees) and are difficult to be modeled by a coarse polygon mesh.

For example, FIG. 1 depicts a graphical representation of an exemplary three-dimensional model 50 of a geographic area from a virtual camera viewpoint. The three-dimensional model 50 includes a base texture 52 that is texture mapped to a polygon mesh. The base texture 52 can be optimized based on a plurality of differing viewpoints of the geographic area. For instance, the base can be optimized for providing a direct (or near direct) and/or non-occluded (or near non-occluded) view of various portions of the three-dimensional model. As an example, a texture can be selected for a portion of the polygon mesh associated with a window of a building using selection criteria that favors a source image that has a direct or near direct view of the window.

Figure 2:
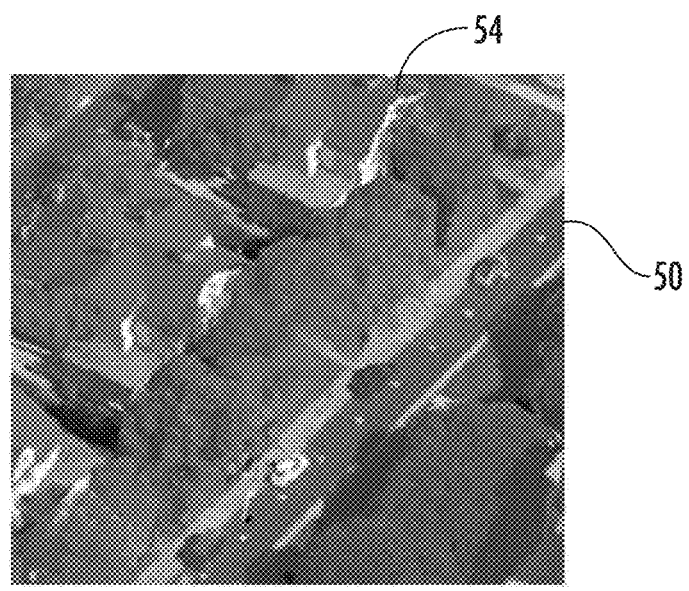
FIG. 2 depict a graphical representation of an exemplary three-dimensional model including a view-dependent texture that is texture mapped to a polygon mesh according to an exemplary embodiment of the present disclosure.

FIG. 2 depicts a graphical representation of an exemplary three-dimensional model 50 of the same geographic area from the same virtual camera viewpoint. However, the three-dimensional model 50 includes a view-dependent texture 54 optimized for the view direction associated with the virtual camera viewpoint. In particular, textures selected for use in the view-dependent texture 54 are selected to favor textures from source images more closely aligned with the view direction associated with the virtual camera viewpoint. For example, a texture can be selected for a portion of the polygon mesh associated with a window of a building using selection criteria that favors a source image that is most closely aligned with the view direction associated with the virtual camera viewpoint. As shown, the view-dependent texture 54 provides better uniformity of color and provides an improved three-dimensional representation of smaller objects, such as trees and cars, in the geographic area.

In response to a request to view the three-dimensional model from a particular virtual camera viewpoint, a base texture can be obtained, for instance, over a network. When the virtual camera viewpoint is close to a reference viewpoint, a view-dependent texture can also be obtained, for instance, over the network and can be rendered in conjunction with the three-dimensional model. Otherwise, the base texture can be rendered in conjunction with the three-dimensional model. If a user navigates the virtual camera from a first virtual camera viewpoint associated with a reference viewpoint to a second virtual camera viewpoint that is not associated with a reference viewpoint, the view-dependent texture rendered in conjunction with the three-dimensional model can be switched to the base texture. In particular implementations, a transition can be provided when the three-dimensional model switches from a view-dependent texture to a base texture and vice versa. The transition can involve blending the view-dependent texture and the base texture based on either virtual camera viewpoint or over a particular period of time (e.g. 1 second) to provide a smooth transition between the view-dependent texture and the base texture.

In this manner, improved views can be provided for standard, default, or other views of the three-dimensional model, such as canonical views of the three-dimensional model. However, the interactive nature of the geographic information can be preserved without imposing large and/or untenable memory requirements by switching to a base texture when the user navigates to less conventional or custom views of the three-dimensional model that are not associated with a reference viewpoint. A view-dependent texture does not have to be generated for each possible view of the three-dimensional model. For instance, in one implementation there is a view-dependent texture for some, but not all, viewpoints of the model. The use of view-dependent textures according to aspects of the present disclosure can provide for a more realistic depiction of a three-dimensional model of a geographic area without falling back to the use of two-dimensional imagery—which can take the user out of the seamless three-dimensional experience provided by textured polygon meshes.

Another exemplary aspect of the present disclosure is directed to the generation of view-dependent textures associated with particular views of the geographic area. For instance, a new reference view of a geographic area can be identified based on usage data indicative of the number of requests to view the three-dimensional model from a particular viewpoint. Popular viewpoints can be selected as reference viewpoints. As another example, reference viewpoints of a geographic area can be identified to be commensurate with the views of the geographic area provided during a virtual tour available in the geographic information system.

To improve the generation of a view-dependent texture associated with the identified reference viewpoint, a source image acquisition plan can be generated that specifies the acquisition of source images more closely aligned with the reference direction. The source images can be acquired according to the source image acquisition plan. For instance, the source images can be acquired from an image capture device mounted on an aircraft while the aircraft is flying along a flight pattern determined based on the source image acquisition plan. The flight plan can be design to acquire images more closely aligned with the reference direction associated with the identified reference viewpoint. Once the source imagery has been required, the view-dependent texture associated with the reference viewpoint can be generated using texture selection criterion that favors the selection of the source images more closely aligned with the reference viewpoint.

Exemplary System for Rendering a
Three-Dimensional Model of a Geographic Area

Figure 3:
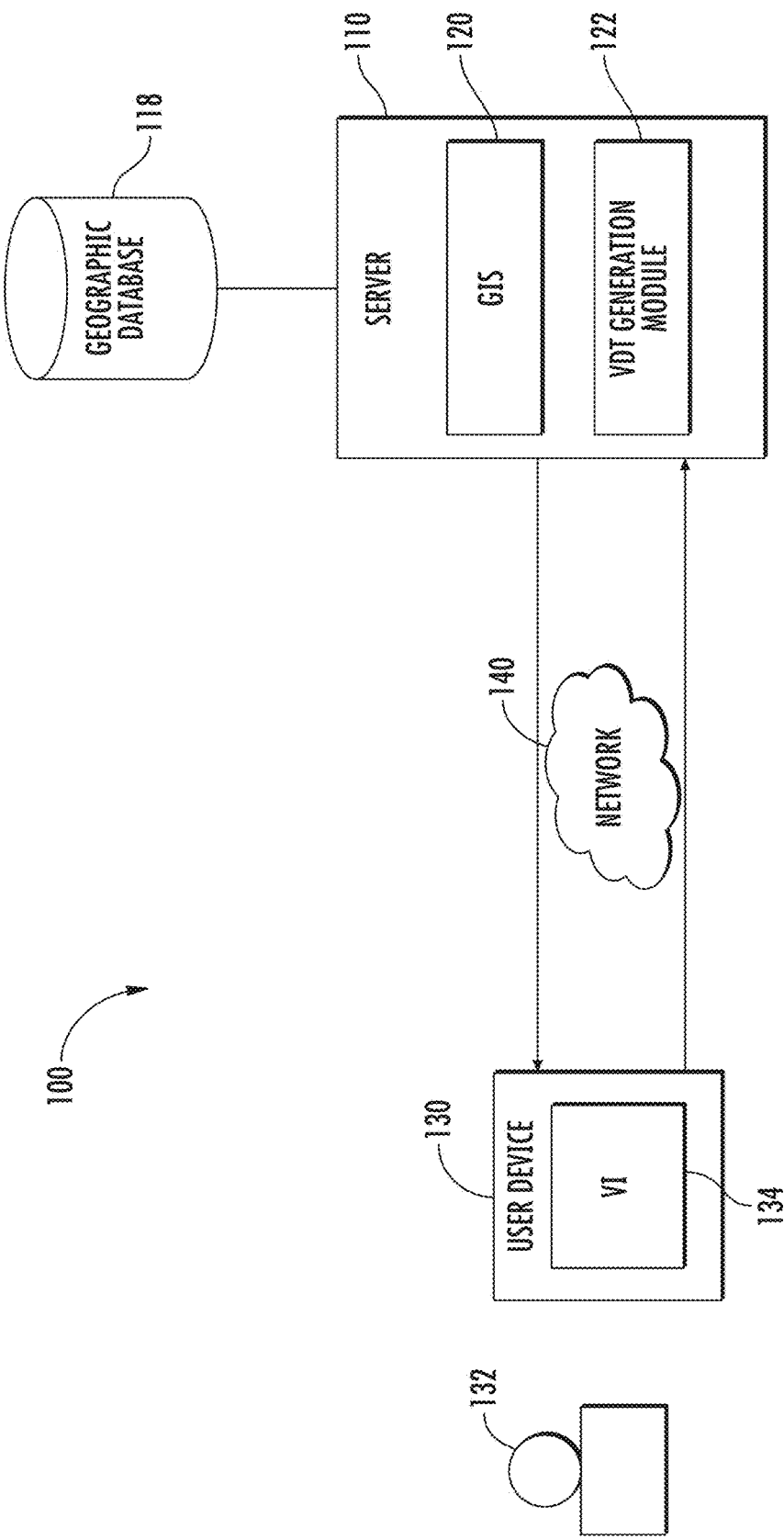
FIG. 3 depicts an exemplary system for rendering a three-dimensional model of a geographic area according to an exemplary embodiment of the present disclosure.

FIG. 3 depicts an exemplary system 100 for rendering a three-dimensional model of a geographic area according to an exemplary embodiment of the present disclosure. The system 100 can include a server 110 for hosting a geographic information system 120. The server 110 can be any suitable computing device, such as a web server. The server 110 can be in communication with a user device 130 over a network 140, such as the Internet. The user device 130 can be any suitable computing device, such as a laptop, desktop, smartphone, tablet, mobile device, wearable computing device, or other computing device.

The server 130 can host an interactive geographic information system 120 that serves geographic data stored, for instance, in a geographic database 118. For instance, the geographic database 118 can include geographic data for rendering an interactive three-dimensional model of a geographic area. The geographic data can include a polygon mesh representing the geometry of the geographic area and one or more textures for mapping to the polygon mesh. The geographic data can be stored in a hierarchical tree data structure, such a quadtree or octree data structure, that spatially partitions the geographic data according to geospatial coordinates.

The polygon mesh can include a plurality of polygons (e.g. triangles) interconnected by vertices and edges to model the geometry of the geographic area. The polygon mesh can be represented in any suitable format, such as a depth map, height field, closed mesh, signed distance field, or any other suitable type of representation. The polygon mesh can be a stereo reconstruction generated from aerial or satellite imagery of the geographic area. The imagery can be taken by overhead cameras, such as from an aircraft, at various oblique or nadir perspectives. In the imagery, features are detected and correlated with one another. The points can be used to determine a stereo mesh from the imagery. In this way, a three-dimensional model can be determined from two-dimensional imagery.

The geographic data can also include a plurality of textures that can be mapped to the polygon mesh to provide a three-dimensional model of the geographic area. The textures can be generated from aerial or satellite imagery of the geographic area. According to aspects of the present disclosure, the geographic data can include a base texture for the geographic area and one or more view-dependent textures for reference viewpoints (e.g. canonical viewpoints) of the geographic area. For instance, in a particular implementation, the geographic data can include a base texture and five different view-dependent textures, one for each of a north oblique viewpoint, a south oblique viewpoint, a west oblique viewpoint, and a nadir viewpoint. The textures can be stored or represented in any suitable format, such as using texture atlases.

The base texture can be optimized based on a plurality of viewpoints of the three-dimensional model. For instance, the base texture can be generated by selecting source images for texture mapping to polygon faces in the polygon mesh using selection criteria that favors the selection of source images that have a non-occluded and/or direct or near direct view of the polygon face. The source images used for the base texture can be associated with a variety of different view perspectives.

The view-dependent textures can be generated by selecting source images for texture mapping to polygon faces in the polygon mesh using selection criteria that favor the selection of source images aligned with the reference direction associated with a reference viewpoint, such as a canonical viewpoint. For instance, in the example of a view-dependent texture associated with a nadir viewpoint, the view-dependent texture can be generated from source images that are more closely aligned with the nadir viewpoint. According to particular aspects of the present disclosure, the server 110 can implement a view-dependent texture (VDT) generation module 122 to generate the view-dependent textures. Exemplary methods implemented by the VDT generation module 122 will be discussed in detail with reference to FIG. 6 below.

Referring back to FIG. 1, the user device 130 can implement a user interface 134 that allows a user 132 to interact with the geographic information system 120 hosted by the server 110. The user interface 134 can be a browser or other suitable client application that can render a three-dimensional model of the geographic area on display associated with the user device 130. The user 132 can interact with the user interface 134 to navigate a virtual camera to view the three-dimensional model from a variety of different virtual camera viewpoints. The user interface 134 can present a variety of different control tools to allow the user to pan, tilt, zoom, or otherwise navigate the virtual camera to view different portions of the three-dimensional model of the geographic area from different perspectives. The control tools can be configured to guide the user to canonical viewpoints of the three-dimensional model. However, the control tools can also be used to navigate the virtual camera to custom views of the three-dimensional model.

In response to the user interactions with the user interface 134, requests for geographic data can be provided from the user device 130 over the network 140 to the server 110. The server 110 can provide geographic data, such as a polygon mesh and one or more textures, to the user device 130. The user device 130 can then render one of the textures in conjunction with the polygon mesh from a viewpoint associated with the virtual camera to present the three-dimensional model of the geographic area to the user. As will be discussed in detail below, view-dependent textures can rendered in conjunction with at least a portion of the three-dimensional model when the user navigates to certain virtual camera viewpoints to enhance the interactive and visual experience of the user.

Exemplary Method for Rendering View-Dependent Textures

Figure 4:
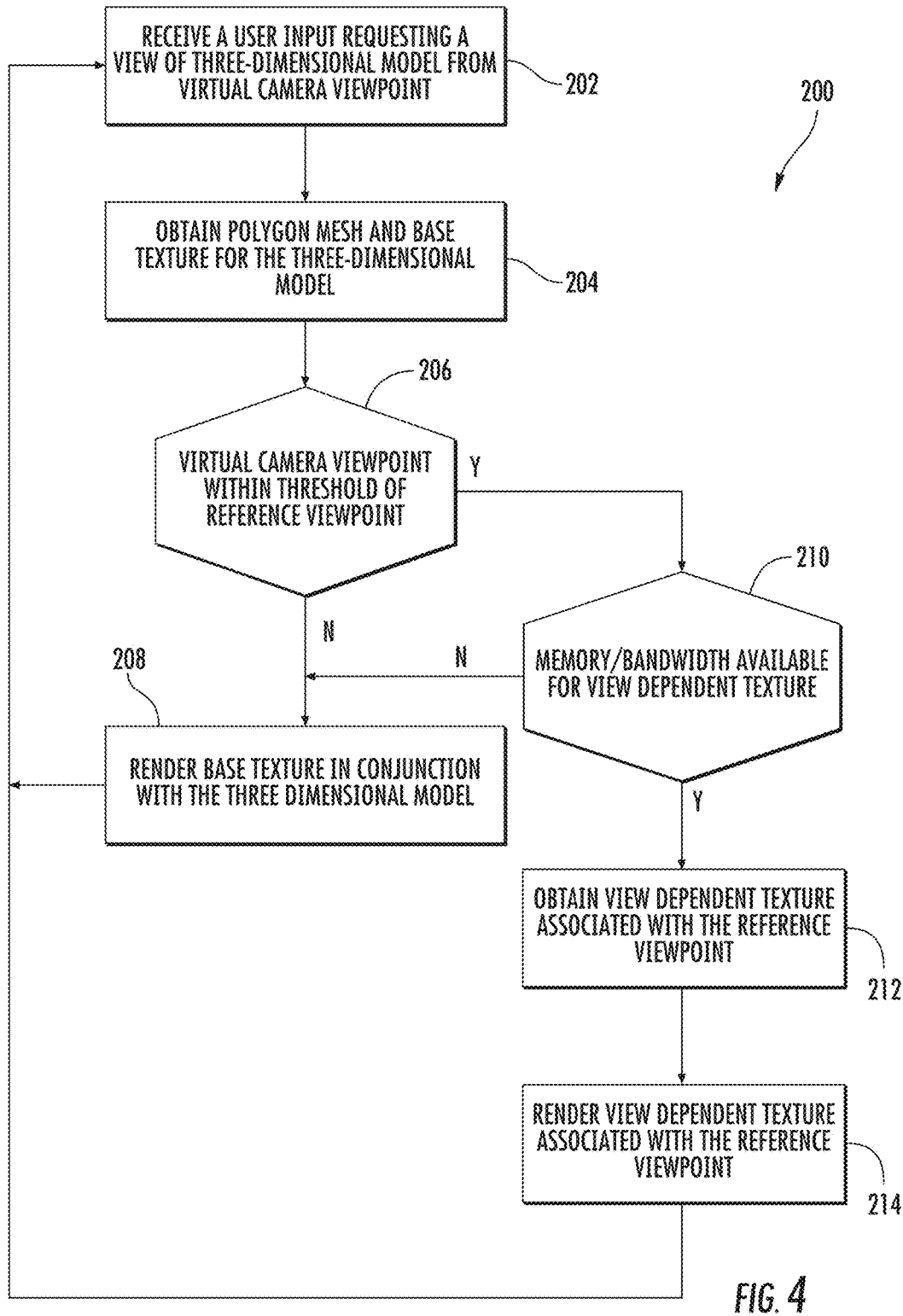
FIG. 4 depicts a flow diagram of an exemplary method for rendering view-dependent textures in conjunction with a polygon mesh according to an exemplary embodiment of the present disclosure.

FIG. 4 depicts a flow diagram of an exemplary method (200) for rendering view-dependent textures in conjunction with a polygon mesh according to an exemplary embodiment of the present disclosure. The method (200) can be implemented using any suitable computing system, such as the user device 130 depicted in FIG. 1. In addition, FIG. 4 depicts steps performed in a particular order for purposes of illustration and discussion. One of ordinary skill in the art, using the disclosures provided herein, will understand that the steps of any of the method discussed herein can be omitted, adapted, rearranged, or expanded in various ways without deviating from the scope of the present disclosure.

At (202), the method includes receiving a user input requesting a view of a three-dimensional model of a geographic area from a virtual camera viewpoint. For instance, a user can navigate a virtual camera using a suitable user interface to view the three-dimensional model from a perspective of the virtual camera viewpoint. The virtual camera viewpoint can be associated with a position and orientation of the virtual camera relative to the three-dimensional model.

At (204), a polygon mesh modeling geometry of the geographic area and a base texture for the three-dimensional model are obtained, for instance, over a network or from memory. For example, if data associated with the polygon mesh and the base texture have previously been fetched from a remote server, the polygon mesh and the base texture can be accessed from a local memory. If the data associated with the polygon mesh and the base texture are not available in a local memory, a request can be made to fetch the data from a remote server over a network, such as the Internet.

At (206), it is determined whether the first virtual camera viewpoint is within a threshold of a reference viewpoint. The reference viewpoint can be a viewpoint associated with an available view-dependent texture in the geographic information system. In a particular implementation, the reference viewpoint is a canonical viewpoint, such as a nadir viewpoint, a north oblique viewpoint, a south oblique viewpoint, an east oblique viewpoint, or a west oblique viewpoint. The canonical viewpoint can be a standard or default viewpoint of the three-dimensional model.

It can be determined whether the virtual camera viewpoint is within a threshold of a reference viewpoint using any suitable comparison technique. In one embodiment, a unit vector associated with the reference viewpoint and a unit vector associated with the first virtual camera viewpoint can be analyzed. The dot product of the vectors can be computed and if the dot product is greater than a threshold value, it can be determined that the virtual camera viewpoint is within a threshold of the reference viewpoint. In another embodiment, the reference viewpoint and the virtual camera viewpoint can be associated with tilt and azimuth angles or other position information (e.g. dimensions along an x, y, and z axis). The differences between the angles and/or the position information of the respective viewpoints can be analyzed and if the differences are less than a threshold value, it can be determined that the virtual camera viewpoint is within a threshold of the reference viewpoint.

If the virtual camera viewpoint is not within a threshold of the reference viewpoint, the method can include rendering the base texture in conjunction with the three-dimensional model (208). In particular, the base texture can be texture mapped to the polygon mesh representing the geometry of the geographic area. The base texture can be optimized based on viewing the three-dimensional model from a plurality of differing viewpoints.

If the virtual camera viewpoint is within a threshold of the reference viewpoint, the method can determine whether there is sufficient memory and/or bandwidth available to obtain and store a view-dependent texture for the three-dimensional model (210). If there is not sufficient memory and/or bandwidth available, the base texture can be rendered in conjunction with the three-dimensional model (208). If there is sufficient memory and/or bandwidth available for a view-dependent texture, the method can obtain the view-dependent texture associated with the reference viewpoint (212). For instance, the view-dependent texture can be accessed from a local memory and/or fetched from a remote computing device over a network.

The view-dependent texture can then be rendered in conjunction with at least a portion of the three-dimensional model (214). In particular, the view-dependent texture can be texture mapped to the polygon mesh. The view-dependent texture can provide a more realistic appearance of the three-dimensional model when viewed from a perspective at or near the reference viewpoint.

As illustrated, the method (200) continues to render the view-dependent texture or base texture in conjunction with the reference viewpoint until another user input requesting a view of the three-dimensional model from a different virtual camera viewpoint is received (202). The method can then be repeated to determine whether to render the base texture or a view-dependent texture in conjunction with the polygon mesh in response to the navigation to the new virtual camera viewpoint.

For example, if the user navigates to a camera viewpoint associated within a threshold of a second reference viewpoint, a second view-dependent texture optimized for viewing the three-dimensional model from the second reference direction can be obtained and rendered on the display in conjunction with at least a portion of the three-dimensional model. If the user navigates to a camera viewpoint that is not within a threshold of any reference viewpoints, the base texture can be rendered on the display in conjunction with at least a portion of the three-dimensional model.

A suitable transition can be provided when switching between view-dependent textures or between a view-dependent texture and a base texture. The transition can be provided by blending the respective textures. For example, when switching from a view-dependent texture to a base texture, a blend between the view-dependent texture and the base texture can be presented and adjusted to provide a smooth transition between textures. The blend can be implemented by adjusting alpha values associated with the textures.

In one implementation, the blend can be adjusted as a function of viewpoint. In particular, the blend can transition from predominately view-dependent texture to predominately base texture as the virtual camera navigates from the first viewpoint associated with the view-dependent texture and the second viewpoint associated with the base texture. For instance, when the virtual camera is 10° from the reference viewpoint, the blend can be 100% view-dependent texture. At 15° from the reference viewpoint, the blend can be a 50/50 blend between the view-dependent texture and the base texture. At 20° from the reference viewpoint, the blend can be 100% base texture.

In another implementation, the blend can be adjusted over time to provide a temporal or time based transition between the textures. In particular the blend can be adjusted over a time period (e.g. 1 second) to gradually fade in the base texture and to gradually fade out the view-dependent texture when the user navigates the virtual camera to a camera viewpoint that is not associated with a reference direction.

Figure 5A:
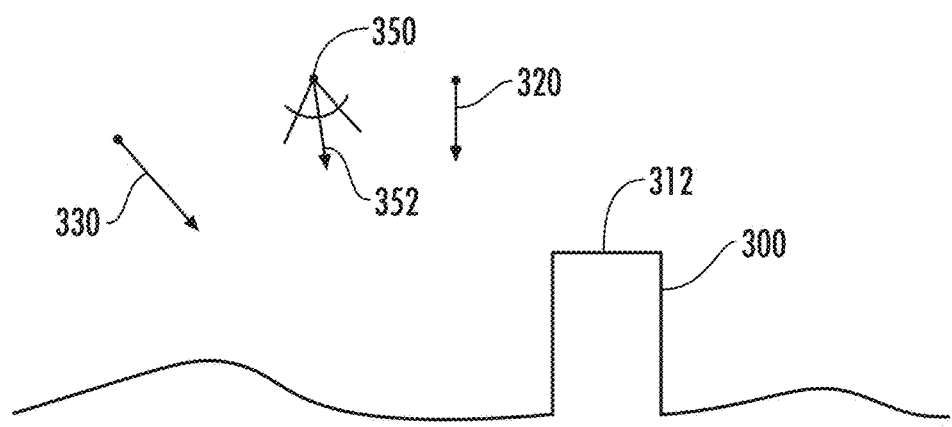
FIGS. 5(a)-5(c) depict the rendering of view-dependent textures in response to the exemplary navigation of a virtual camera relative to a three-dimensional model according to an exemplary embodiment of the present disclosure.
Figure 5B:
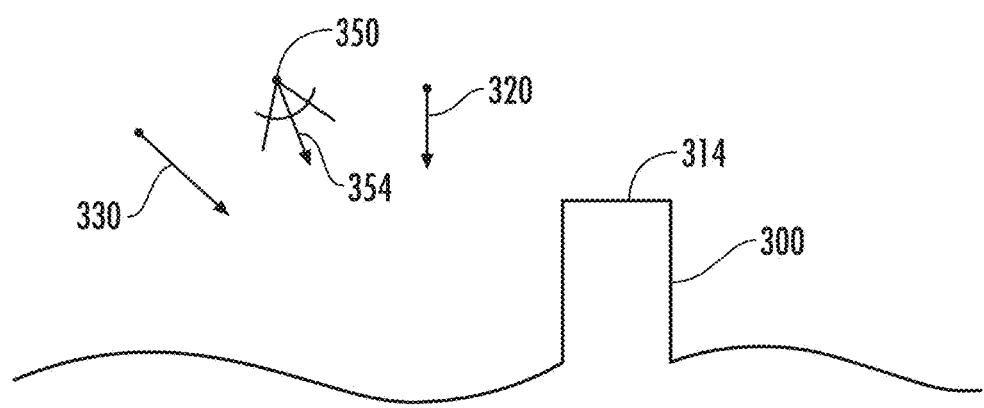
Figure 5C:
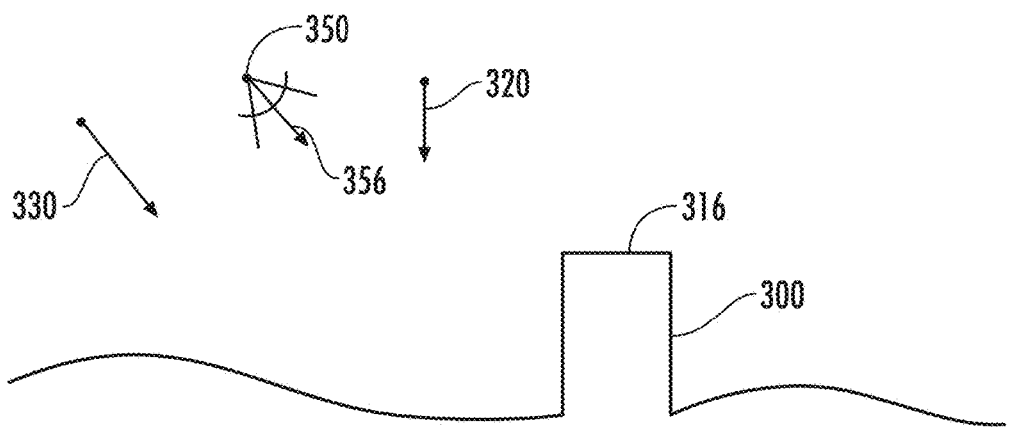

The exemplary method (200) of rendering view-dependent textures in conjunction with a three-dimensional model of a geographic area can be more readily understood with reference to the exemplary navigation of a virtual camera depicted in FIGS. 5(a)-5(c). FIG. 5(a)-5(c) depict an exemplary three-dimensional model 300 of a geographic area that can be rendered on a display device. FIGS. 5(a)-5(c) illustrate two-dimensional representations for purposes illustration and discussion. One of ordinary skill in the art, using the disclosures provided herein, will recognize that the two dimensional representations can be representative of three-dimensional elements.

The three-dimensional model 300 can include a polygon mesh and a texture that is mapped to the polygon mesh. The three-dimensional model 300 can be viewed from the perspective of a virtual camera 350. View-dependent textures can be available for a first reference viewpoint 320 of the three-dimensional model 300 and a second reference viewpoint of the three-dimensional model 300. The first reference viewpoint 320 can be associated with a nadir perspective. The second reference viewpoint 330 can be associated with an oblique perspective, such as a north oblique perspective (i.e. a view facing in the north direction).

In FIG. 5(a), the virtual camera 350 has been navigated to a first virtual camera viewpoint 352. As demonstrated in FIG. 5(a), the first virtual camera viewpoint is close to (i.e. within a threshold of) the nadir perspective defined by the first reference viewpoint 320. As a result, a first view-dependent texture 312 associated with the first reference viewpoint 320 can be rendered in conjunction with at least a portion of the three-dimensional model 300. The first view-dependent texture 312 can be optimized for viewing the three-dimensional model 300 from the reference direction associated with the first reference viewpoint 320.

In FIG. 5(b), the virtual camera 350 has been navigated to a second virtual camera viewpoint 354. As demonstrated, the second virtual camera viewpoint 354 is not close to (i.e. is not within a threshold of) either the nadir perspective defined by the first reference viewpoint 320 or the oblique perspective defined by the second reference viewpoint 330. As a result, a base texture 314 can be rendered in conjunction with at least a portion of the three-dimensional model 300. The base texture 314 can be optimized based on viewing the three-dimensional model 300 from a plurality of differing view directions. A suitable transition can be provided between the view-dependent texture 312 and the base texture 314 as the user navigates the virtual camera 350 to the second virtual camera viewpoint 354. The transition can include rendering a blend between the view-dependent texture 312 and the base texture 314.

In FIG. 5(c), the virtual camera 350 has been navigated to a third virtual camera viewpoint 356. The third virtual camera viewpoint 356 is close to (i.e. within a threshold of) the oblique perspective defined by the second reference viewpoint 330. As a result, a second view-dependent texture 316 can be rendered in conjunction at least a portion of with the three-dimensional model 300. The second view-dependent texture 316 can be optimized for viewing the three-dimensional model 300 from the reference direction associated with the second reference viewpoint 330. A suitable transition can be provided between the view-dependent texture 316 and the base texture 314 as the user navigates the virtual camera 350 to the second virtual camera viewpoint 356. The transition can include rendering a blend between the view-dependent texture 316 and the base texture 314.

Exemplary Generation of View-Dependent Textures

Figure 6:
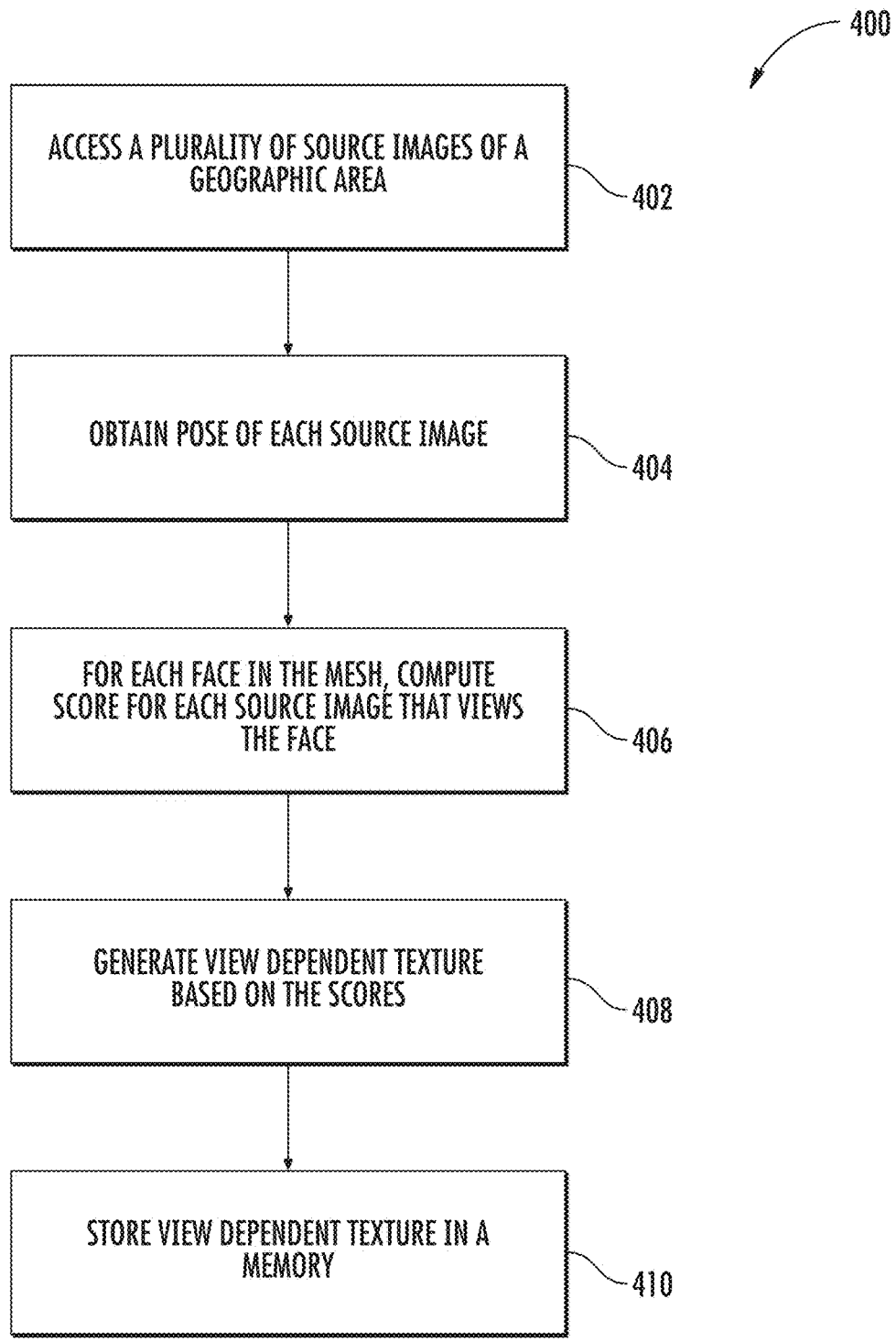
FIG. 6 depicts a flow diagram of an exemplary method for generating view-dependent textures according to an exemplary embodiment of the present disclosure.

FIG. 6 depicts a flow diagram of an exemplary method (400) for generating a view-dependent texture according to an exemplary embodiment of the present disclosure. As discussed in detail above, a view-dependent texture according to aspects of the present disclosure is optimized for viewing the three-dimensional model from a single reference direction. In particular, the view-dependent texture can be generated from source images using a selection mechanism that favors source images more closely aligned with the single reference direction associated with the view-dependent texture. FIG. 6 depicts one exemplary method for generating a view-dependent texture optimized for viewing the three-dimensional model from a single reference direction.

At (402), the method includes accessing a plurality of source images of a geographic area. The plurality of source images can include digital images that have been captured by an image capture device, such as a digital camera. The plurality of source images can be satellite images or aerial images. For instance, the plurality of source images can be acquired by an image capture device mounted on an aircraft as the aircraft flies over the geographic area.

Preferably, at least some of the plurality of source images are taken along a view direction associated with the view-dependent texture. For instance, in the example where view-dependent textures are to be generated for a nadir viewpoint, a north oblique viewpoint, a south oblique viewpoint, an east oblique viewpoint, and/or a west oblique viewpoint, the plurality of source images can include source images captured from a camera along a view direction associated with one or more of the nadir viewpoint, a north oblique viewpoint, a south oblique viewpoint, an east oblique viewpoint and a west oblique viewpoint.

At (404), pose information for each source image can be obtained. For instance, the pose of each source image can be accessed from a memory or determined using a suitable posing technique. The pose for each source image can provide position and orientation information for the image capture device that captured the source image. The pose of the source images provides data for useful for selecting source images for generating a view-dependent texture, such as the camera location and camera view direction of the source image relative to various portions of the polygon mesh.

For each polygon face in the polygon mesh, a score is computed for each source image that views the polygon face (406). The score computed for each source image can favor source images that are more directly aligned with the reference direction associated with the view-dependent texture. The scores for source images can be computed for each polygon face individually. Alternatively, the polygon mesh can be divided into groups of polygon faces. Scores for source images can be determined for the group.

In one particular implementation, the score computed for each source image can include a base component B and a view dependent component V. The base component B can be determined to favor source images that directly point to a surface normal of the polygon faces. The base component B can also take into account other factors, such as occlusion of the polygon faces in the source image. The view dependent component V can be based on the relationship between the camera view direction associated with the source image and the reference direction associated with the view-dependent texture. The view-dependent texture component V can dominate the computation of the score for each source image.

One exemplary algorithm for computing the score for each source image based on a base component and a view dependent component will now be set forth. To compute the score, polygon faces in the mesh can be clustered into groups. The base component B can be determined for source images for each group as follows:

$$B = o^3 * (n \text{ Dot } c + \alpha)/(d+\beta)$$

o is the fraction of the surface area of the group that is unoccluded. n is the area-weighted average of face normal in the group. c is a unit vector from p toward the camera location. p is the average of all vertices in all polygon faces in the group. d is the distance from p to the camera associated with the source image. The vector c and the distance d can be determined based on the pose of the source image. $\alpha$ and $\beta$ are coefficients that can be modified to adjust the determination of the base component B. In a particular implementation, if n dot c is less than a first threshold, the base component B can be reduced (e.g. to 10% of its original value). If n dot c is less than a second threshold that is lower than the first threshold, the base component B can be set to 0.

The V component can be determined as follows:

$$V = \max(0, (-c) \text{dot } v')$$

c is the unit vector from p towards the camera location. v' is a unit vector associated with the reference direction for the view-dependent texture.

The V component and the B component can be combined to generate the score for each image. For instance, the score can be calculated as follows:

$$\text{Score} = w_1 * V + w_2 * B$$

where w1 and w2 are weighting factors associated to the V component and the B component respectively. The V component will typically be in the range of 0 to 1. The B component is typically much smaller, but can be scaled to also lie in the range of 0 to 1.

Other suitable scoring algorithms can be used to compute the scores for each source image without deviating from the scope of the present disclosure. In addition, different factors can be taken into the scoring of the source images. For instance, the scores can be adjusted to prefer certain sets of source images over others (e.g. source images acquired from different flights of an aircraft over the geographic area). A graph cut algorithm can also be used to avoid choosing images that cause large color discontinuities when textured onto the polygon mesh.

Referring to FIG. 6 at (408), the method includes generating a view-dependent texture based on the scores. As an example, for each polygon face, the source image with the highest score can be selected for texturing the polygon face. The selected source images can then be textured to their respective polygon faces to generate the view-dependent texture. The view-dependent texture can then be stored in a memory (410). The view-dependent texture can be represented or stored in any suitable format. For instance, the view-dependent texture can be represented as a texture atlas that maps textures selected from the source images to respective polygon faces in the mesh. The view-dependent texture can be stored in a hierarchical tree data structure, such as a quadtree or octree data structure, that spatially partitions the view-dependent texture according to geospatial coordinates.

In some implementations, it can be desirable to map the view-dependent textures to lower resolution polygon meshes modeling the geographic area. For instance, lower resolution polygon meshes can be generated and served for level of detail management in the geographic information system. According to aspects of the present disclosure, reduced resolution view-dependent textures can be mapped to such lower resolution polygon meshes based on the reference view direction associated with the view-dependent texture.

In particular, a second polygon mesh having a lower resolution than a first polygon mesh to which the view-dependent texture is mapped can be accessed. The second polygon mesh can be generated by simplifying the first polygon mesh using mesh simplification techniques, such as vertex collapse techniques. A texture atlas can be allocated for the second polygon mesh. The texture atlas can map a texture onto a portion of a three-dimensional surface defined by the second polygon mesh. The texture atlas for the second polygon mesh can be filled in by determining a location on the second polygon mesh that corresponds to a portion (e.g. a pixel) in the texture atlas for the second polygon mesh.

A location on the first polygon mesh corresponding to the determined location on the second polygon mesh can then be identified. The location on the first polygon mesh corresponding to the location on the second polygon mesh can be identified by extending a ray along the reference view direction (as opposed to along a face normal) from the second polygon mesh to a corresponding location on the first polygon mesh and determining an intersection of the ray and the first polygon mesh. Color value(s) associated with a texture mapped to the first polygon mesh at the determined location on the first polygon mesh can then be identified. The color value(s) can then be set to the portion (e.g. pixel(s)) in the texture atlas for the second polygon mesh.

Acquisition of Source Imagery for View-Dependent Textures

Figure 7:
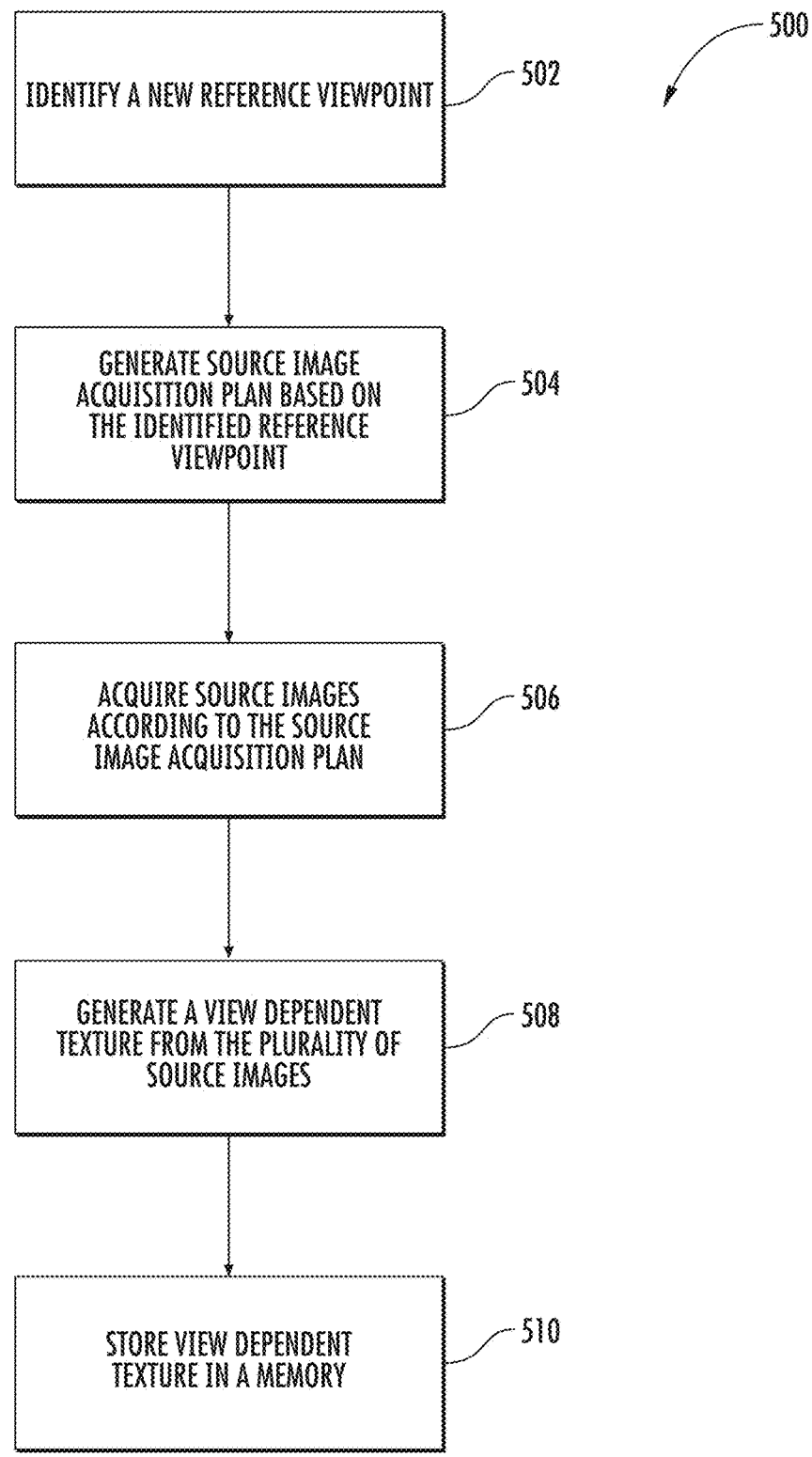
FIG. 7 depicts a flow diagram of an exemplary method for acquiring source images for generating new view-dependent textures according to an exemplary embodiment of the present disclosure.

FIG. 7 depicts a flow diagram of an exemplary method (500) for acquiring source images for generating view-dependent textures according to an exemplary embodiment of the present disclosure. At (502), the method includes identifying a new reference viewpoint for viewing the three-dimensional model. The new reference viewpoint can be a viewpoint of the three-dimensional model that does not yet have an associated view-dependent texture. The reference viewpoint can be identified using suitable criteria for identifying predominate views of the three-dimensional model.

For instance, in one embodiment, the reference viewpoint can be identified as a view of a geographic area provided as part of a virtual tour. A virtual tour in a geographic information system can automatically navigate a virtual camera through a plurality of different viewpoints of the three-dimensional model of geographic area to highlight or discuss certain aspects of the three-dimensional model. One or more of the viewpoints of the three-dimensional model presented during the virtual tour can be selected as a reference viewpoint for a view-dependent texture.

In another embodiment, the reference viewpoint can be identified based on usage data for the geographic information system. The usage data can be indicative of the number of times users have requested to view the three-dimensional model from a particular viewpoint. One or more popular viewpoints, as determined from the usage data, can be identified as a reference viewpoint for a view-dependent texture.

To generate a quality view-dependent texture for the newly identified reference viewpoint, the source imagery used to generate the view-dependent texture should preferably be closely aligned with the reference direction associated with the reference viewpoint. Source imagery of the geographic area aligned in this manner may not initially be available for generating the view-dependent texture.

In this regard at (504), the method can include generating a source image acquisition plan based on the identified reference viewpoint. The source image acquisition plan can specify the acquisition of source images along a view direction generally aligned with the reference direction associated with the identified reference viewpoint. In particular, the image acquisition plan can call for the acquisition of source images having a view direction that is aligned or nearly aligned (e.g. within 20° of) with the reference direction associated with the reference viewpoint.

At (506), the source images can be acquired according to the source image acquisition plan. For instance, the source images can be acquired using a vehicle mounted image capture device as the vehicle traverses through the geographic area according to a route determined based on the image acquisition plan. As another example, source images can be acquired from an aircraft mounted image capture device as the aircraft is flying along a flight pattern determined based on the source image acquisition plan. The flight pattern can be determined based on the source image acquisition plan by specifying flight routes that cause the aircraft mounted image capture device to capture source imagery along the reference direction associated with the reference viewpoint.

Once the source images have been acquired, the view-dependent texture can be generated from the plurality of source images (508). The view-dependent texture can be generated using a texture selection mechanism that favors the selection of source images that are aligned or nearly aligned with the reference direction associated with the reference viewpoint. For instance, the method for generating view-dependent textures discussed with reference to FIG. 6 above can be used to generate the view-dependent texture for the newly identified reference viewpoint.

Referring back to FIG. 7 at (510), the view-dependent texture can be stored in a memory. The view-dependent texture can be represented in any suitable format, such as a texture atlas. The view-dependent texture can be served and rendered on a display device when a user navigates a virtual camera to a virtual camera viewpoint that is within a threshold of the newly identified reference viewpoint.

Figure 8:
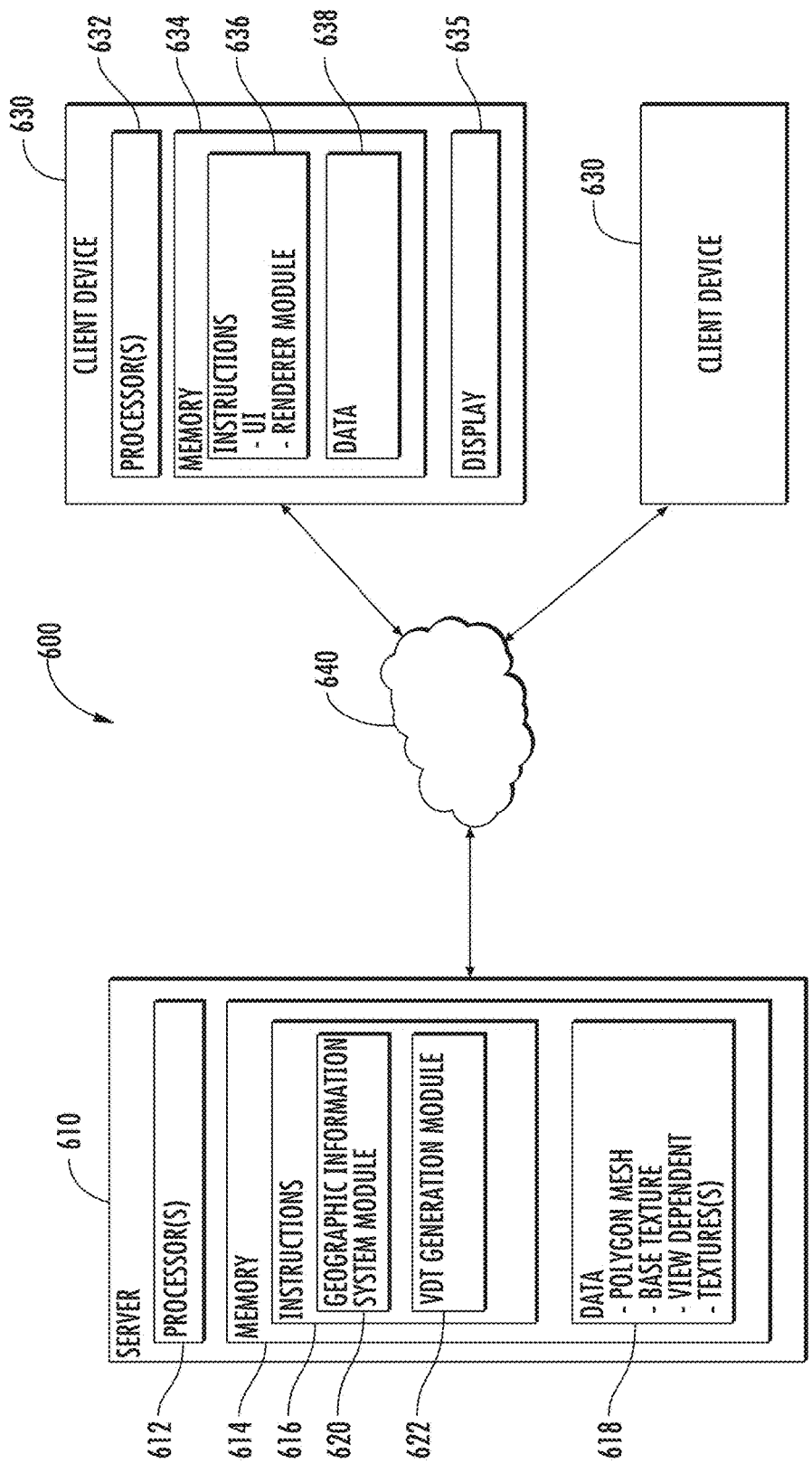
FIG. 8 depicts an exemplary computer-based system according to an exemplary embodiment of the present disclosure.

Exemplary Computing Environment for Generating and Rendering View-Dependent Textures FIG. 8 depicts an exemplary computing system 600 that can be used to implement the methods and systems for generating and rendering view-dependent textures according to aspects of the present disclosure. The system 600 is implemented using a client-server architecture that includes a server 610 that communicates with one or more client devices 630 over a network 640. The system 600 can be implemented using other suitable architectures, such as a single computing device.

The system 600 includes a server 610, such as a web server used to host a geographic information system. The server 610 can be implemented using any suitable computing device(s). The server 610 can have a processor(s) 612 and a memory 614. The server 610 can also include a network interface used to communicate with one or more client devices 630 over a network 640. The network interface can include any suitable components for interfacing with one more networks, including, for example, transmitters, receivers, ports, controllers, antennas, or other suitable components.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement a geographic information system module 620, a VDT generation module 622, and other modules.

The geographic information system module 620 can be configured to perform functionality associated with hosting a geographic information system, such as responding to requests for geographic data used to render a three-dimensional model of a geographic area. The VDT generation module 622 can be configured to generate view-dependent textures according to any of the methods disclosed herein. Other modules can be implemented in conjunction with the system 600.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 614 can also include data 618 that can be retrieved, manipulated, created, or stored by processor(s) 612. The data 618 can include geographic data to be served as part of the geographic information system, such as polygon meshes, base textures, view-dependent textures, and other geographic data. The geographic data can be stored in a hierarchical tree data structure, such as quadtree or octree data structure, that spatially partitions the geographic data according to geospatial coordinates. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 8, any number of client devices 630 can be connected to the server 610 over the network 640. The client devices 630 can be any suitable type of computing device, such as a general purpose computer, special purpose computer, laptop, desktop, mobile device, smartphone, tablet, wearable computing device, or other suitable computing device.

Similar the computing device 610, a client device 630 can include a processor(s) 632 and a memory 634. The processor(s) 632 can include one or more central processing units, graphics processing units dedicated to efficiently rendering images, etc. The memory 634 can store information accessible by processor(s) 632, including instructions 636 that can be executed by processor(s) 632. For instance, the memory 634 can store instructions 636 for implementing an application that provides a user interface (e.g. a browser) for interacting with the geographic information system. The memory 634 can also store instructions 636 for implementing a rendering module. The rendering module can be configured to render a textured polygon mesh to provide a graphical representation of a three-dimensional model of a geographic area. The rendering module can render a view-dependent texture in conjunction with at least a portion of the three-dimensional model when a user requests a view of the three-dimensional model from a viewpoint associated with a reference viewpoint.

The memory 634 can also store data 638, such as polygon meshes, base textures, view-dependent textures, and other geographic data received by the client device 630 from the server 610 over the network. The geographic data can be stored in a hierarchical tree data structure that spatially partitions the geographic data according to geospatial coordinates associated with the data.

The client device 630 can include various input/output devices for providing and receiving information from a user, such as a touch screen, touch pad, data entry keys, speakers, and/or a microphone suitable for voice recognition. For instance, the computing device 630 can have a display 635 for rendering the graphical representation of the three-dimensional model.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for rendering a three-dimensional model of a geographic area, comprising:
   receiving, by one or more computing devices, a user input requesting a view of the three-dimensional model from a first virtual camera viewpoint;
   in response to the user input requesting the view of the three-dimensional model from the first virtual camera viewpoint:
      obtaining, by the one or more computing devices, a polygon mesh modeling geometry of the geographic area and a base texture for the three-dimensional model, the base texture optimized based on viewing the three-dimensional model from a plurality of different viewpoints, the base texture generated from a plurality of source images associated with a plurality of different viewpoints for providing a direct view of different portions of the three-dimensional model; and providing for display, by the one or more computing devices, the base texture in conjunction with the polygon mesh;

receiving, by the one or more computing devices, a user input requesting a view of the three-dimensional model from a second virtual camera viewpoint;

in response to the user input requesting the view of the three-dimensional model from the second camera viewpoint:

obtaining, by the one or more computing devices, a view-dependent texture for the three-dimensional model, the view-dependent texture optimized for viewing the three-dimensional model from a single reference direction associated with a reference viewpoint, the view dependent texture generated from a plurality of source images, each source image for the view dependent texture selected based at least in part on a relationship between a camera view direction associated with the source image and the reference direction associated with the reference viewpoint;

determining, by the one or more computing devices, that the second virtual camera viewpoint is within a threshold of the reference viewpoint; and transitioning from providing for display, by the one or more computing devices, the base texture in conjunction with at least a portion of the polygon mesh to providing for display, by the one or more computing devices, the view-dependent texture in conjunction with at least a portion of the polygon mesh when the second virtual camera viewpoint is within the threshold of the reference viewpoint.

2. The computer-implemented method of claim 1, wherein the view-dependent texture is obtained in response to determining that the second virtual camera viewpoint is within a threshold of the reference viewpoint.

3. The computer-implemented method of claim 1, wherein the method comprises receiving, by the one or more computing devices, a user input requesting a view of the three-dimensional model from a third virtual camera viewpoint.

4. The computer-implemented method of claim 3, wherein the method comprises:

determining, by the one or more computing devices, that the third virtual camera viewpoint is within a threshold of a second reference viewpoint;

obtaining, by the one or more computing devices, a second view-dependent texture, the second view-dependent texture optimized for viewing the three-dimensional model from the second reference viewpoint; and providing for display, by the one or more computing devices, the second view-dependent texture in conjunction with the polygon mesh.

5. The computer-implemented method of claim 3, wherein the method comprises:

determining, by the one or more computing devices, that the third virtual camera viewpoint is not within a threshold of the second reference viewpoint; and providing for display, by the one or more computing devices, the base texture in conjunction with the polygon mesh.

6. The computer-implemented method of claim 1, wherein transitioning from providing for display, by the one or more computing devices, the base texture in conjunction with at least a portion of the polygon mesh to providing for display, by the one or more computing devices, the view-dependent texture comprises rendering a blend between the view-dependent texture and the base texture.

7. The computer-implemented method of claim 1, wherein the view-dependent texture is generated from a plurality of source images by:

determining, by the one or more computing devices, a score for at least one of the plurality of source images based at least in part on the relationship between a camera view direction associated with the source image and the reference direction associated with the reference viewpoint; and texturing, by the one or more computing devices, a portion of the polygon mesh based at least in part on the score determined for the source image.

8. The computer-implemented method of claim 7, wherein the score is determined based at least in part on the relationship between the camera view direction associated with the source image and a face normal associated with the portion of the polygon mesh.

9. The computer-implemented method of claim 1, wherein the reference viewpoint is a canonical viewpoint associated with the geographic area.

10. The computer-implemented method of claim 1, wherein the canonical viewpoint comprises a north oblique viewpoint, a south oblique viewpoint, an east oblique viewpoint, a west oblique viewpoint, or a nadir viewpoint.

11. The computer-implemented method of claim 1, wherein the reference viewpoint is a viewpoint of the three-dimensional model provided as a part of a virtual tour.

12. The computer-implemented method of claim 1, wherein the reference viewpoint is determined based on usage data indicative of the number of requests for viewing the three-dimensional model from a perspective associated with the canonical viewpoint.

* * * * *